US009372460B2

(12) United States Patent
Shirafuji

(10) Patent No.: US 9,372,460 B2
(45) Date of Patent: Jun. 21, 2016

(54) IMAGE FORMING APPARATUS HOLDING TONE CORRECTION TABLE

(71) Applicant: CANON KABUSHIKI KAISHA, Tokyo (JP)

(72) Inventor: Yasuhito Shirafuji, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/535,530

(22) Filed: Nov. 7, 2014

(65) Prior Publication Data
US 2015/0153694 A1    Jun. 4, 2015

(30) Foreign Application Priority Data

Dec. 3, 2013 (JP) .................................. 2013-250555

(51) Int. Cl.
G03G 15/00 (2006.01)
H04N 1/40 (2006.01)
H04N 1/60 (2006.01)

(52) U.S. Cl.
CPC ................. *G03G 15/50* (2013.01); *H04N 1/40* (2013.01); *H04N 1/603* (2013.01); *G03G 15/5041* (2013.01); *G03G 15/5058* (2013.01); *G03G 15/5062* (2013.01); *G03G 15/5066* (2013.01); *G03G 15/556* (2013.01); *G03G 2215/00029* (2013.01); *G03G 2215/00033* (2013.01); *G03G 2215/00037* (2013.01)

(58) Field of Classification Search
CPC ............ G03G 15/011; G03G 15/0115; G03G 15/04027; G03G 15/50; G03G 15/5041; G03G 15/5058; G03G 15/5062; G03G 15/5066; G03G 15/507; G03G 15/556; G03G 2215/00029; G03G 2215/00033; G03G 2215/00037; H04N 1/40
See application file for complete search history.

(56) References Cited

U.S. PATENT DOCUMENTS

| 5,583,644 | A | 12/1996 | Sasanuma et al. |
| 5,752,126 | A | 5/1998 | Muramatsu |
| 2014/0314432 | A1* | 10/2014 | Uchino .................. G03G 15/50 399/49 |

FOREIGN PATENT DOCUMENTS

| JP | 4-267272 A | 9/1992 |
| JP | 6-198973 A | 7/1994 |

OTHER PUBLICATIONS

U.S. Appl. No. 14/516,747, dated Oct. 17, 2014.

* cited by examiner

*Primary Examiner* — Joseph S Wong
(74) *Attorney, Agent, or Firm* — Fitzpatrick, Cella, Harper & Scinto

(57) ABSTRACT

An image forming apparatus includes: a correction unit configured to correct image data based on a correction condition; an image forming unit configured to form an image based on the image data corrected by the correction unit; a measurement unit configured to measure a measurement image formed by the image forming unit; an update unit configured to control the correction unit to correct measurement image data based on the correction condition, control the image forming unit to form the measurement image based on the corrected measurement image data, and update the correction condition based on a measurement result and reference data corresponding to the measurement image; and a control unit configured to control whether or not to convert a measuring result of a target measurement image by the measurement unit to target reference data corresponding to the target measurement image.

10 Claims, 9 Drawing Sheets

FIG. 2A
TEST PATTERN R
10 TONES
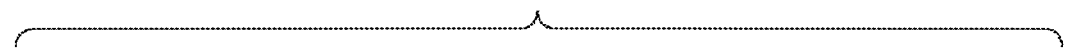
FIG. 2B
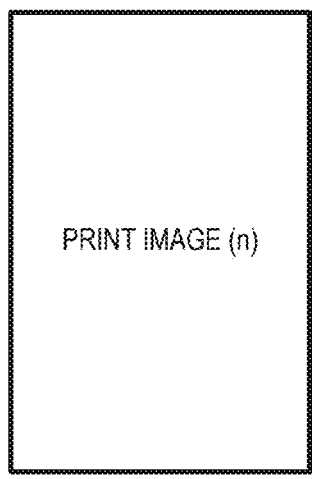
PRINT IMAGE (n)
TEST PATTERN Q
5 TONES
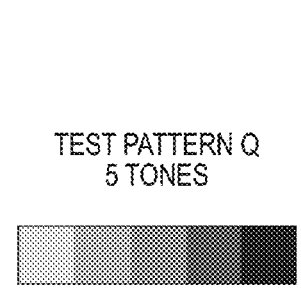
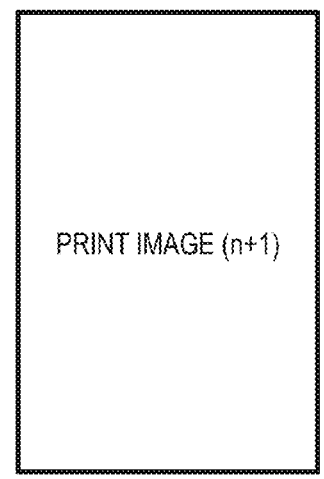
PRINT IMAGE (n+1)

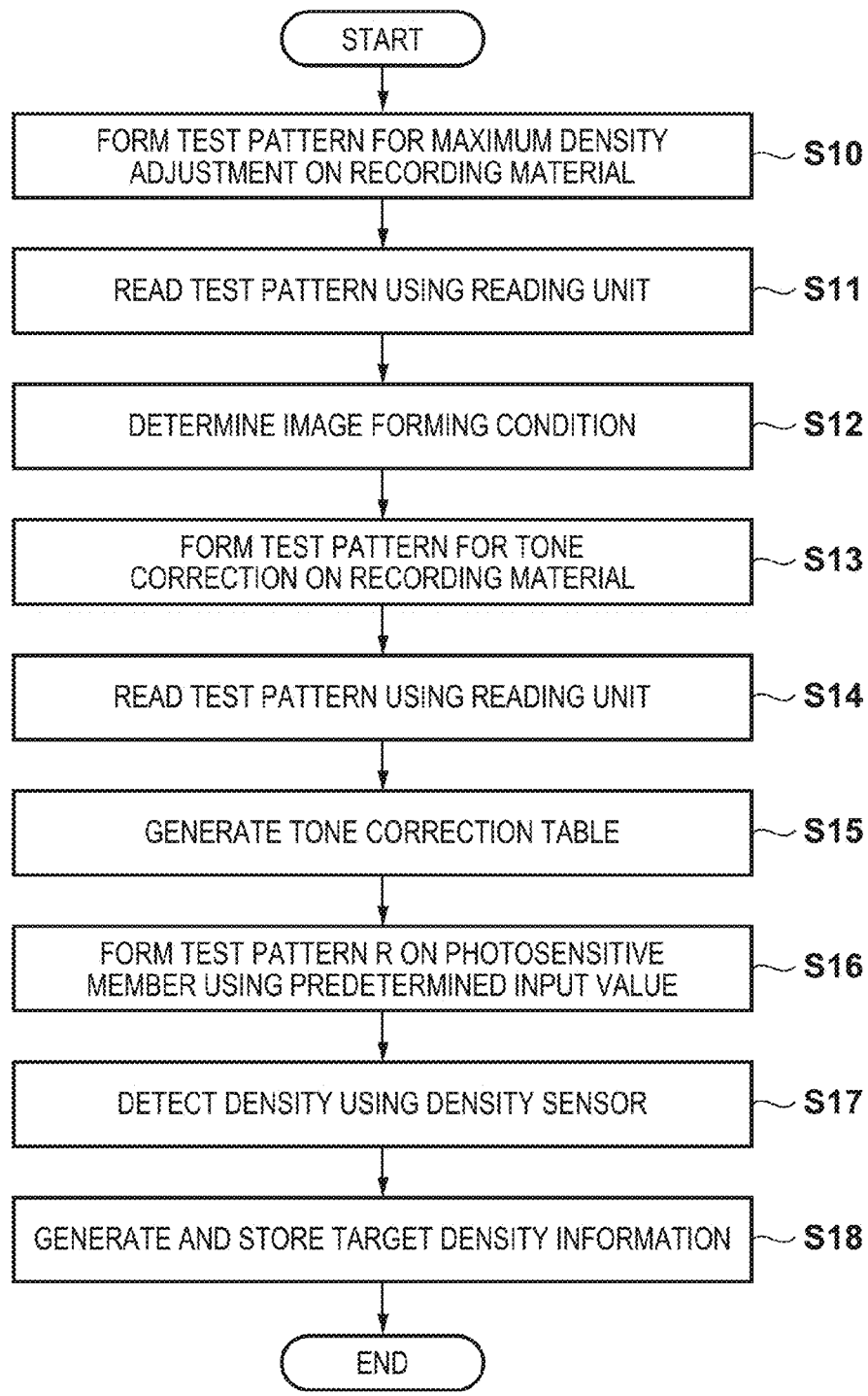

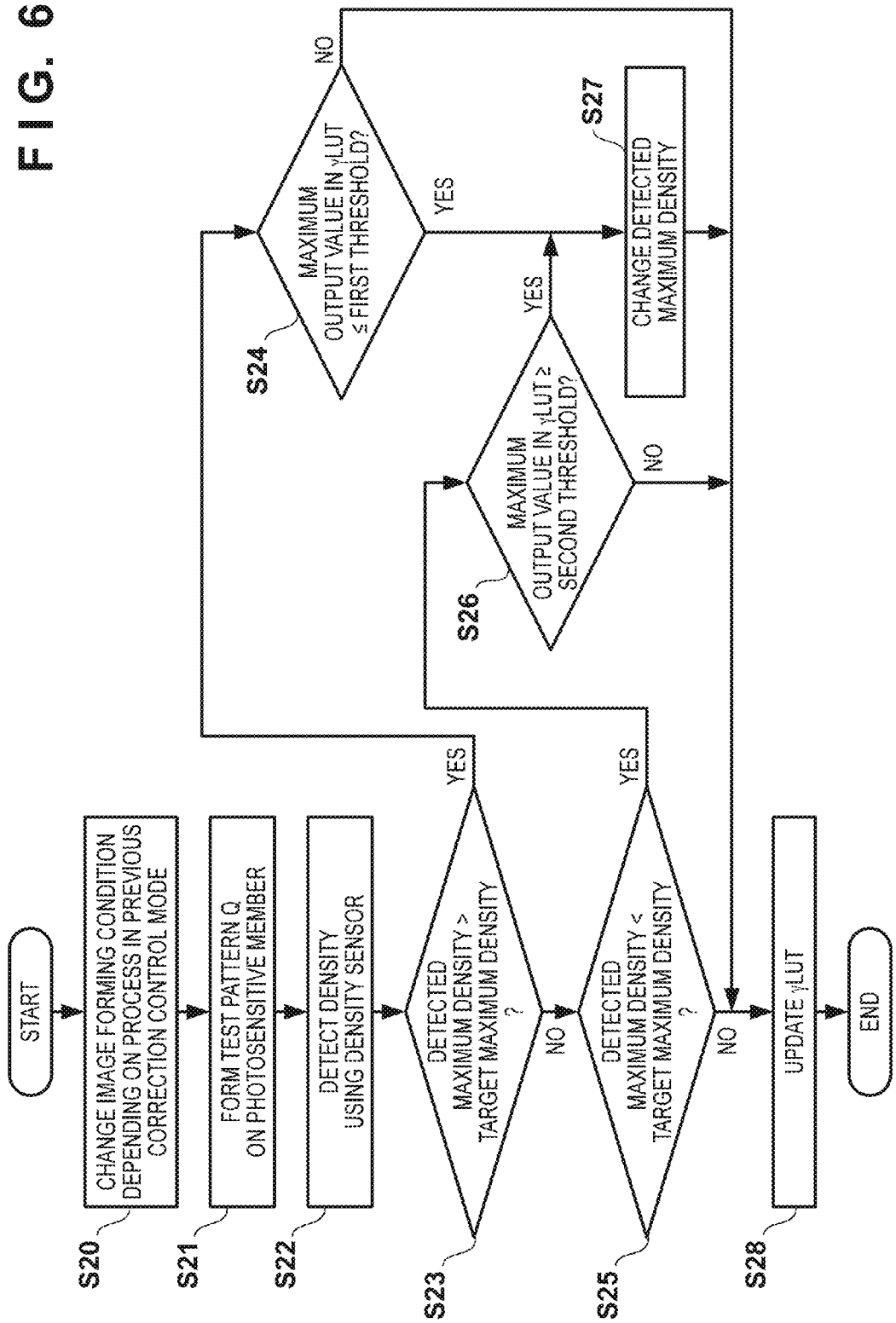

JAGGIES

IMAGE FORMING APPARATUS HOLDING TONE CORRECTION TABLE

BACKGROUND OF THE INVENTION

1. Field of the Invention

The present disclosure relates to a density control technique in an image forming apparatus.

2. Description of the Related Art

An image forming apparatus using an electrophotographic scheme is required to have output image density stability and tone stability. U.S. Pat. No. 5,752,126 and U.S. Pat. No. 5,583,644 each disclose an arrangement in which a test pattern is formed on an image carrier and the density of the formed test pattern is read using a sensor or the like to adjust an image forming condition or generate a tone correction table, thus stabilizing the image quality.

The density of an image formed by the image forming apparatus depends not only on the image forming condition such as developing contrast potential but also on the charge amount of the developer itself. For example, when the consumption of the developer increases due to the use status of the user, the developer in the developing unit is used for image formation without being sufficiently frictionally-charged. This increases the density of the formed image. When the consumption of the developer decreases due to the use status of the user, on the other hand, the charge amount of the developer in the developing unit increases more than expected, because of frictional electrification. This decreases the density of the formed image. For example, if the charge amount of the developer in the developing unit keeps increasing, density control is performed to keep increasing the output image data value corresponding to the input image data value in the tone correction table, in order to compensate for the decrease in density. However, since the output image data value has a maximum value, if the charge amount of the developer in the developing unit keeps increasing, the tone correction table generated in the density control may convert all input image data values not less than a predetermined value to the same maximum output image data value. The tone characteristics cannot be maintained in such a case. If the charge amount of the developer in the developing unit keeps decreasing, density control is performed to keep decreasing the output image data value corresponding to the input image data value in the tone correction table. In such a case, jaggies may appear in line portions of the formed image.

SUMMARY OF THE INVENTION

According to an aspect of the present invention, an image forming apparatus includes: a correction unit configured to correct image data based on a correction condition; an image forming unit configured to form an image based on the image data corrected by the correction unit; a measurement unit configured to measure a measurement image formed by the image forming unit; an update unit configured to control the correction unit to correct measurement image data based on the correction condition, control the image forming unit to form the measurement image based on the corrected measurement image data, and update the correction condition based on a measurement result of the measurement image by the measurement unit and reference data corresponding to the measurement image; and a control unit configured to control whether or not to convert a measuring result of a target measurement image among measurement images by the measurement unit to target reference data corresponding to the target measurement image.

Further features of the present invention will become apparent from the following description of exemplary embodiments with reference to the attached drawings.

BRIEF DESCRIPTION OF THE DRAWINGS

FIGS. 2A and 2B are each a diagram showing a test pattern according to an embodiment.

FIG. 3 is a flowchart showing tone correction control according to an embodiment.

FIG. 6 is a flowchart showing tone correction table correction control according to an embodiment.

DESCRIPTION OF THE EMBODIMENTS

The following describes exemplary embodiments of the present invention with reference to the drawings. The embodiments described below are for illustrative purposes only, and the scope of the present invention is not limited to these embodiments. Structural elements not necessary for the description of the embodiments are omitted from the drawings.

First Embodiment

Figure 1:
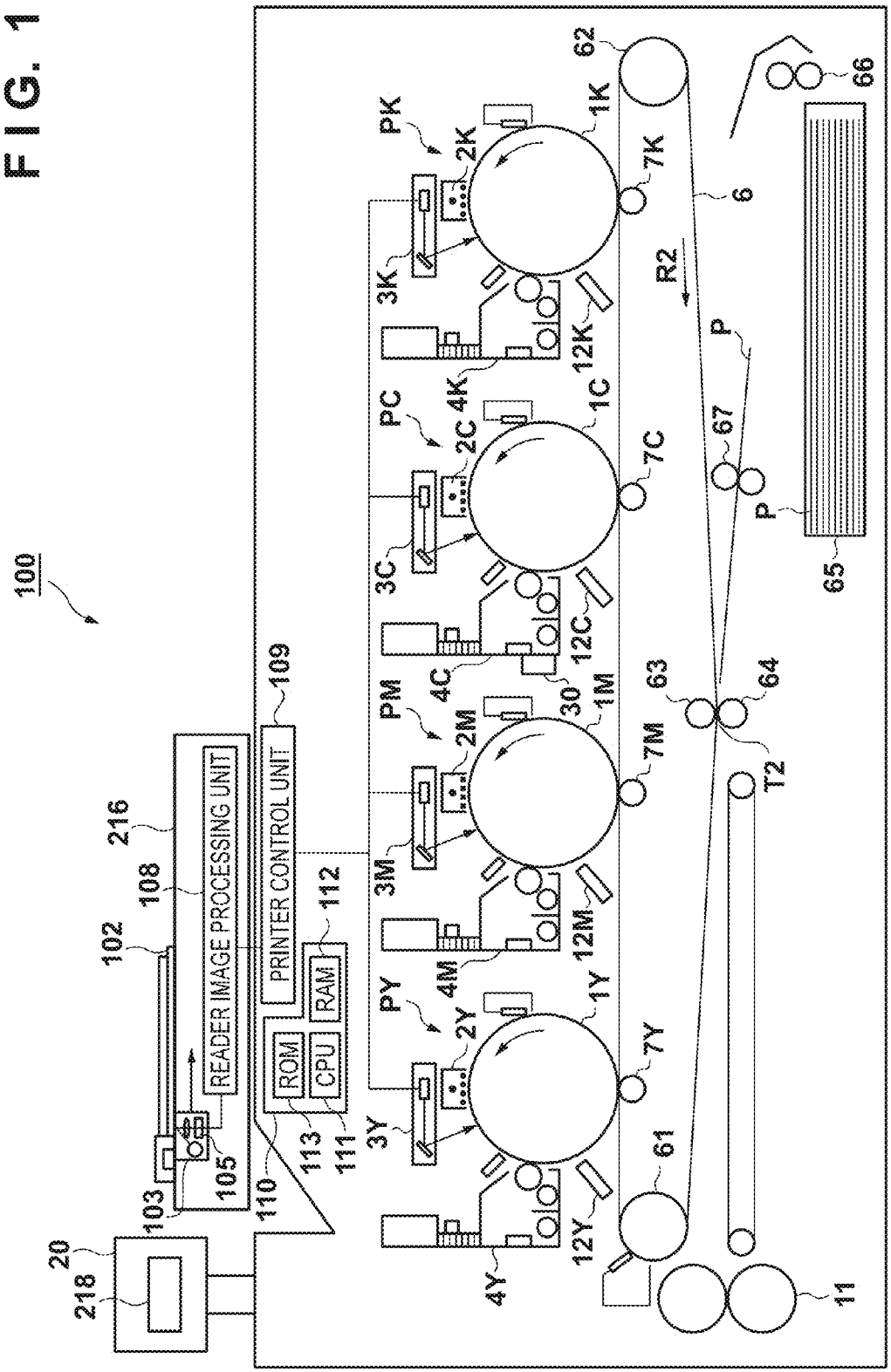
FIG. 1 is a schematic diagram showing an image forming apparatus according to an embodiment.

FIG. 1 is a diagram showing an image forming apparatus 100 according to this embodiment. In the image forming apparatus 100 in FIG. 1, image forming units PY, PM, PC, and PK of yellow, magenta, cyan, and black, respectively, are arranged along an intermediate transfer belt 6. In the image forming unit PY, a photosensitive member 1Y is an image carrier, and is rotated in the direction of the arrow in the figure and charged to a predetermined potential by a charging unit 2Y. An exposure unit 3Y scans and exposes the photosensitive member 1Y with light, to form an electrostatic latent image on the surface of the photosensitive member 1Y. A developing unit 4Y outputs a developing bias to supply yellow toner (developer) to the electrostatic latent image on the photosensitive member 1Y, to visualize the image as a toner image. A primary transfer roller 7Y outputs a primary transfer bias, to transfer the toner image formed on the photosensitive member 1Y to the intermediate transfer belt 6. The image forming unit PY also includes a density sensor 12Y for detecting the density of the toner image formed on the photosensitive member 1Y. For example, the density sensor 12Y irradiates the photosensitive member 1Y with light, and detects the density from the reflected light.

The image forming units PM, PC, and PK have the same structure as the image forming unit PY except that the color of the toner used is different, and so the description of the image forming units PM, PC, and PK is omitted. In the following description, the reference numerals without the letters Y, M, C, and K are used in the case where the colors need not be distinguished. The toner images formed on the photosensitive members 1 of the respective image forming units are transferred to the intermediate transfer belt 6 in a superimposed manner, as a result of which a multicolor toner image is formed on the intermediate transfer belt 6.

The intermediate transfer belt 6 is extended between three rollers 61, 62, and 63, and rotated in the direction of arrow R2 in the figure. A recording material P extracted from a cassette 65 is conveyed toward a secondary transfer region T2 composed of the roller 63 and a secondary transfer roller 64, by roller pairs 66 and 67. The toner image transferred to the intermediate transfer belt 6 is transferred to the recording material P at the secondary transfer region T2. A fixing unit 11 applies heat and pressure to the recording material P, to fix the toner image to the recording material P. The recording material P is then ejected outside the apparatus.

A light source 103 in a reading unit 216 irradiates a recording material placed on a platen 102 with light. A CCD sensor 105 receives the reflected light, to read the image on the recording material. A reader image processing unit 108 and a printer control unit 109 perform predetermined image processing on the image data read by the CCD sensor 105. The image forming apparatus 100 in this embodiment is capable of printing not only an image read by the reading unit 216 also image data received via a phone line (fax) or image data received from a computer via a network. An operation unit 20 includes a display unit 218 for operating the image forming apparatus 100 by the user and displaying the state of the image forming apparatus 100 to the user. A control unit 110 integrally controls the image forming operation by the image forming apparatus 100, and includes a CPU 111, a RAM 112, and a ROM 113. The control unit 110 determines/obtains the density information of the toner image formed on the photosensitive member 1, based on the signal from the density sensor 12. The CPU 111 controls the image forming apparatus 100 using programs and various data held in the ROM 113, with the RAM 112 as a work area. The image forming apparatus 100 also includes an environment sensor 30 for obtaining environment information in the image forming apparatus, such as at least one of the temperature and the humidity, and notifying the control unit 110 of the environment information.

The following describes density control in this embodiment. The density control in this embodiment includes: tone correction control for generating a tone correction table (γLUT); and tone correction table correction control for correcting the tone correction table generated by the tone correction control. The density control is performed for each color. In this embodiment, the tone correction control is executed according to operation by the user or when a predetermined condition is satisfied. In the tone correction control, a toner image is formed on a recording material and fixed to the recording material, and the fixed toner image is read by the reading unit 216 to determine the density-related image forming condition. An image forming condition for forming an image of the target maximum density (hereinafter referred to as a maximum density condition value) and a tone correction table for converting the value of input image data to achieve the target density are generated in the tone correction control. The generated tone correction table is used to form a test pattern R shown in FIG. 2A on the photosensitive member 1, using the determined maximum density condition value. In this embodiment, the test pattern R is an image pattern having 10 types of density (tone) including a solid image (maximum density image) as shown in FIG. 2A, though the number of tones is not limited to such. The image forming apparatus 100 measures the density of the test pattern R using the density sensor 12, and obtains target density information indicating the correspondence relationship between the value of image data used to form the test pattern R and the density of the image formed on the photosensitive member 1 using the value.

After this, each time a predetermined number of sheets are fed during continuous image formation, the image forming apparatus 100 performs the tone correction table correction control (hereinafter simply referred to as correction control). In the correction control, a test pattern Q shown in FIG. 2B is formed on the photosensitive member 1, and the density of the test pattern Q is detected by the density sensor 12 to correct the tone correction table. In the correction control, the test pattern Q is formed in an area between print toner images on the surface of the photosensitive member 1, as shown in FIG. 2B. Input values used to form the test pattern Q are stored in the ROM 113 or the RAM 112. In this embodiment, the input values used to form the test pattern Q are five different values including the maximum image data value. In other words, the test pattern Q is a pattern including images of five different levels of density (tone) including a solid (maximum density) image, though the number of tones is not limited to such.

Figure 4A:
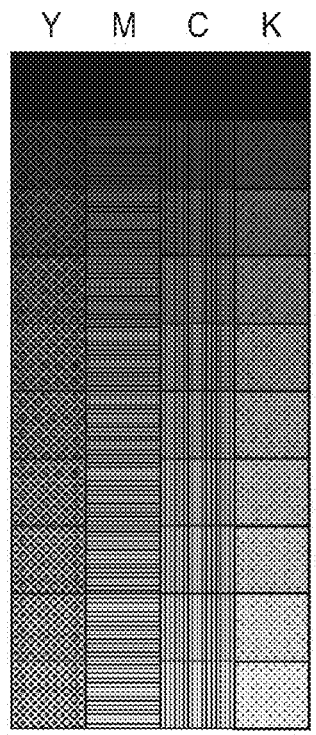
FIGS. 4A and 4B are each a diagram showing a test pattern formed in tone correction control according to an embodiment.

The tone correction control is described in detail below, with reference to FIG. 3. In step S10, the control unit 110 forms a test pattern on a recording material, using image data of the value indicating the maximum density. FIG. 4A shows an example of the test pattern formed in step S10. For example, the test pattern shown in FIG. 4A has the input value of 255 indicating the maximum density in the case where the input image data value is expressed by 8 bits, and is formed while changing the density-related image forming condition. Though the image forming condition changed to control the density is the exposure amount in the following description, any other density-related image forming condition, e.g. a value for changing the developing contrast such as a developing bias or a charging bias, may be changed. Moreover, a plurality of density-related image forming conditions may be changed. The user sets the recording material on which the test pattern is formed, in the reading unit 216. In step S11, the control unit 110 causes the reading unit 216 to read the test pattern, to detect the density. In step S12, based on the detected density, the control unit 110 determines the maximum density condition value, that is, the value of the image forming condition that enables a toner image formed using the maximum input value to have the target maximum density. In this example, the image forming condition is the exposure amount as mentioned above.

Figure 4B:
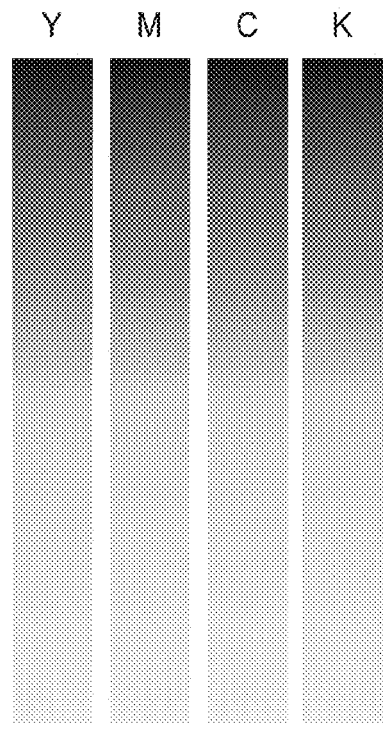
Figure 5:
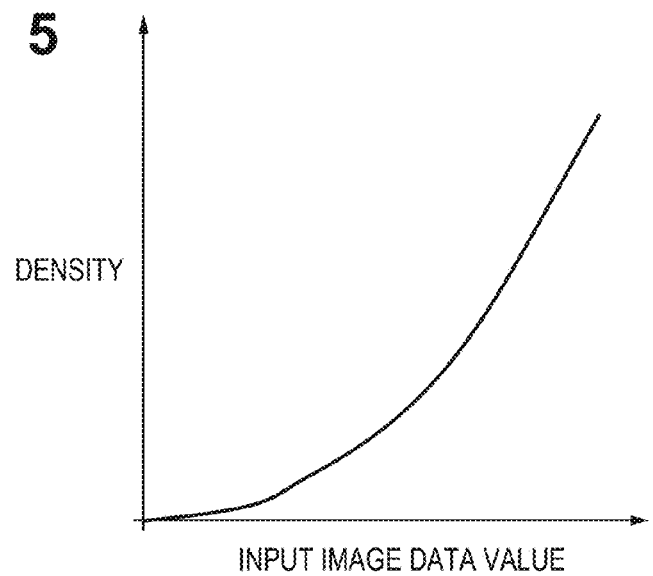
FIG. 5 is a diagram showing the relationship between the input image data value and the target density according to an embodiment.

Next, in step S13, the control unit 110 forms a test pattern for tone correction, on a recording material. FIG. 4B shows an example of the test pattern formed in step S13. For example, the test pattern shown in FIG. 4B is formed using a plurality of values selected from 0 to 255, in the case where the input image data value is 8 bits. The user sets the recording material on which the test pattern is formed, in the reading unit 216. In step S14, the control unit 110 causes the reading unit 216 to read the test pattern, to detect the density. In step S15, the control unit 110 generates a tone correction table based on the detected density. After this, in step S16, the control unit 110 forms the test pattern R shown in FIG. 2A on the photosensitive member 1. In step S17, the control unit 110 detects the density of the formed test pattern R, using the density sensor 12. In step S18, the control unit 110 generates target density information indicating the correspondence relationship between the input value used for image formation in step S16 and the density of each image of the test pattern R formed based on the input value detected in step S17, and stores the target density information in the RAM 112. FIG. 5 shows the relationship between the input image data value obtained by interpolating the target density information stored in step S18 and the density of the image formed on the photosensitive member 1. The detected density of each image of the test pattern R detected in step S17 is hereinafter referred to as the target density corresponding to the input value used to form each image. The detected density of the solid image of the test pattern R is hereinafter referred to as the target maximum density.

The tone correction table correction control according to this embodiment is described below, with reference to FIG. 6. As mentioned earlier, the correction control is performed each time a predetermined number of sheets are fed during continuous image formation. When the correction control starts, in step S20, the control unit 110 changes the density-related image forming condition, i.e. the exposure amount in this embodiment, in the case where the process in step S27 in FIG. 6 was performed in the previous correction control. In the case where the process in step S27 in FIG. 6 was not performed in the previous correction control, on the other hand, the control unit 110 does not change the density-related image forming condition. The process in step S27 and the change of the exposure amount in step S20 will be described in detail later. Next, in step S21, the control unit 110 forms the test pattern Q shown in FIG. 2B, on each photosensitive member 1. In step S22, the control unit 110 detects the density of each image of the formed test pattern Q, using the density sensor 12. Here, the test pattern Q is formed using the tone correction table stored in the RAM 112.

Figure 7A:
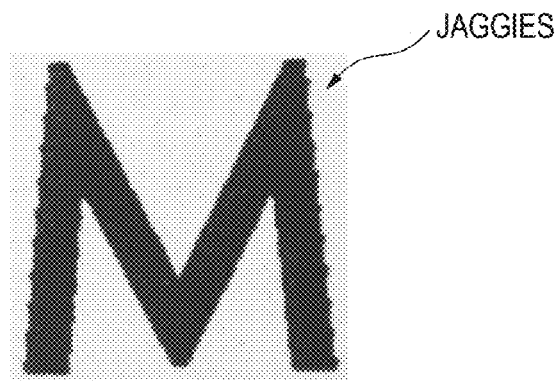
FIGS. 7A and 7B are each a diagram showing a formed image according to an embodiment.

Next, in step S23, the control unit 110 determines whether or not the target maximum density is higher than the detected maximum density of the test pattern Q, the detected density of the solid image of the test pattern Q. In the case where the detected maximum density is higher than the target maximum density, the output image data value corresponding to the maximum input image data value in the tone correction table is to be changed to a smaller value, in order to obtain the image of the target maximum density. Excessively decreasing the output image data value corresponding to the maximum input image data value in the tone correction table may, however, cause jaggies as shown in FIG. 7A, resulting in lower quality of letters and line portions. Accordingly, in step S24, the control unit 110 determines whether or not the maximum output image data value (maximum output value) in the tone correction table (γLUT) can be further decreased. In detail, in this embodiment, the control unit 110 determines whether or not the maximum output value in the tone correction table to be corrected is already not greater than a first threshold. In the case where the maximum output value is not greater than the first threshold, the control unit 110 determines that the maximum output value cannot be further decreased, and performs the process in step S27. In the case where the maximum output value is greater than the first threshold, the control unit 110 performs the process in step S28. For example, in the case where the tone correction table converts an 8-bit input image data value to a 10-bit output image data value, the first threshold may be set to 800.

Figure 8:
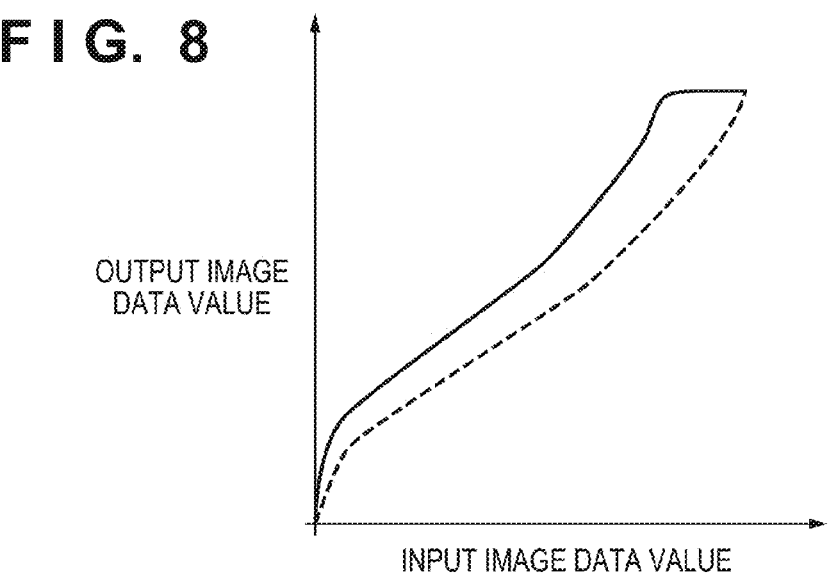
FIG. 8 is a diagram showing an example of a tone correction table corrected using only a result of detecting a formed image.

In the case where the result of step S23 is "No", the control unit 110 determines in step S25 whether or not the detected maximum density of the test pattern Q is lower than the target maximum density. In the case where the detected maximum density is lower than the target maximum density, the output image data value corresponding to the maximum input image data value in the tone correction table is to be changed to a larger value, in order to obtain the image of the target maximum density. Excessively increasing the output image data value corresponding to the maximum input image data value in the tone correction table may, however, cause the tone correction table to have such characteristics as shown by the solid line in FIG. 8, making it impossible to maintain the tone characteristics in the vicinity of the maximum density. The dotted line in FIG. 8 shows a tone correction table with which the tone characteristics can be maintained. Accordingly, in step S26, the control unit 110 determines whether or not the maximum output image data value (maximum output value) in the tone correction table (γLUT) can be further increased. In detail, in this embodiment, the control unit 110 determines whether or not the maximum output value in the tone correction table to be corrected is already not less than a second threshold. In the case where the maximum output value is not less than the second threshold, the control unit 110 determines that the maximum output value cannot be further increased, and performs the process in step S27. In the case where the maximum output value is less than the second threshold, the control unit 110 performs the process in step S28. For example, in the case where the tone correction table converts an 8-bit input image data value to a 10-bit output image data value, the second threshold may be set to 1023.

Figure 9A:
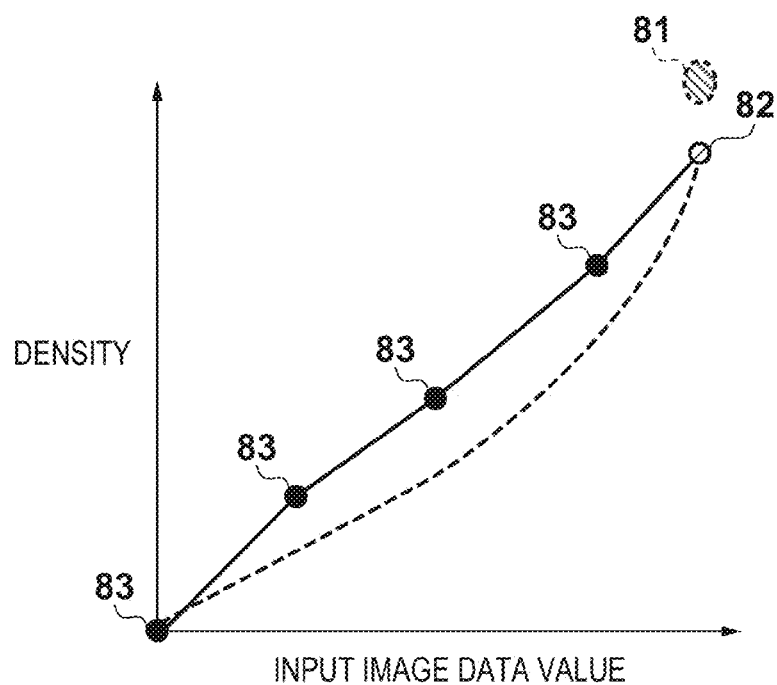
FIGS. 9A and 9B are each a diagram for describing a substitution process according to an embodiment.
Figure 9B:
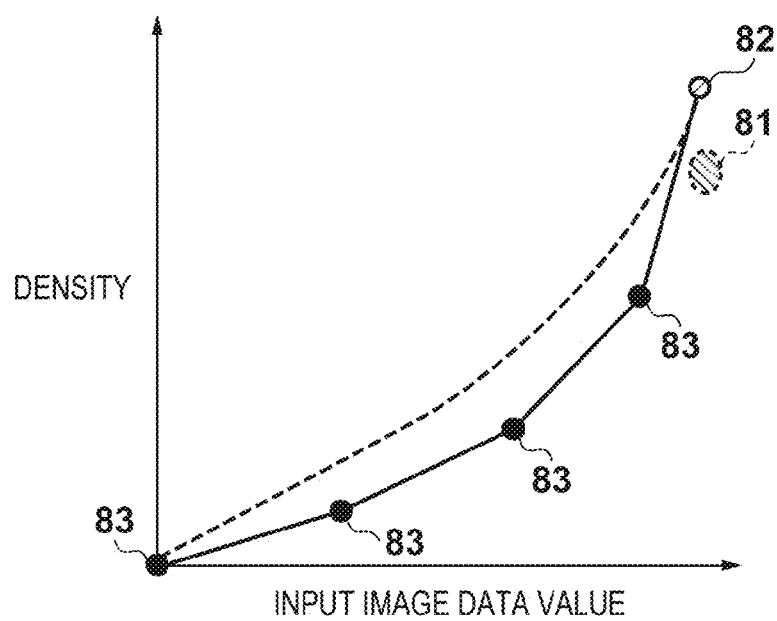

The process in step S27 is described below, with reference to FIGS. 9A and 9B. In FIGS. 9A and 9B, reference numeral 81 denotes the detection result of the density of the solid image of the test pattern Q, and reference numeral 83 denotes the detection result of the density of each of the other four images (hereafter referred to as intermediate density images). The dotted line in each of FIGS. 9A and 9B shows the relationship between the input image data value and the density indicated by the target density information. For example, in the case where the maximum output value in the current tone correction table is already not greater than the first threshold in step S24 in FIG. 6, in step S27 the control unit 110 changes the detected density 81 of the solid image of the test pattern Q to the target maximum density shown by reference numeral 82 in FIG. 9A. Here, the detected density may be changed to predetermined density less than the detected density and not less than the target maximum density. Likewise, in the case where the maximum output value in the current tone correction table is already not less than the second threshold in step S26, in step S27 the control unit 110 changes the detected density 81 of the solid image of the test pattern Q to the target maximum density shown by reference sign 82 in FIG. 9B. Here, the detected density may be changed to a predetermined density greater than the detected density and not greater than the target maximum density.

Figure 10:
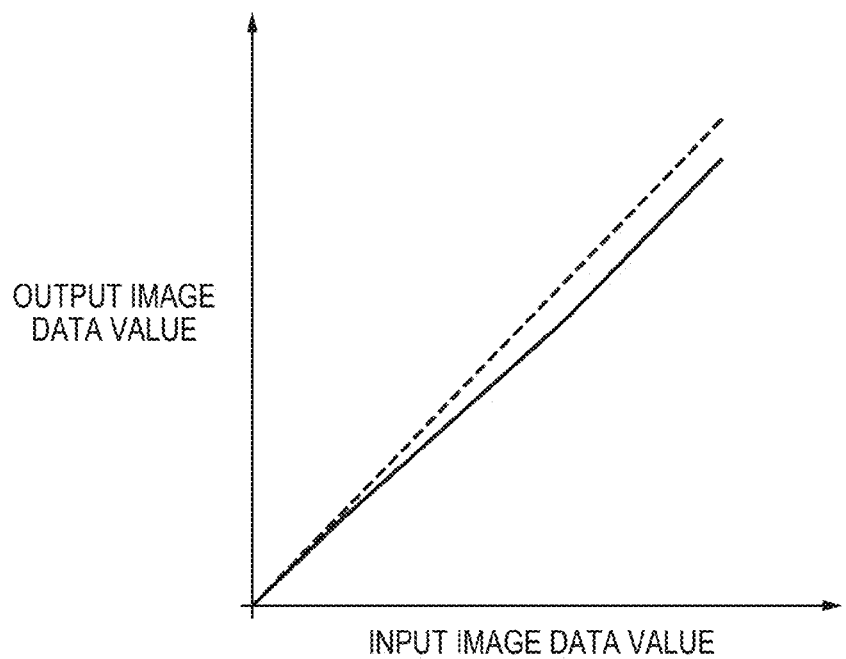
FIG. 10 is a graph showing an inverse conversion table according to an embodiment.

The process in step S28 in FIG. 6 is described below. In the case where the control unit 110 does not perform step S27, the control unit 110 sets the actual measurement value of the test pattern Q as a processing value. In the case where the control unit 110 performs step S27, the control unit 110 sets the value obtained by substituting the actual measurement value with the predetermined density for the density of the solid image, as a processing value. The control unit 110 plots each processing value as shown in each of FIGS. 9A and 9B, to linearly interpolate the values. The control unit 110 then inverse-converts each processing value with respect to the target density information shown by the dotted line in each of FIGS. 9A and 9B, to generate an inverse conversion table. FIG. 10 is a graph showing the input image data value and the output image data value indicated by the inverse conversion table. The dotted line in FIG. 10 shows the inverse conversion table in the case where each processing value is the same as the target density information, that is, each processing value is on the dotted line in each of FIGS. 9A and 9B, where the input image data value and the output image data value are the same. The solid line in FIG. 10 shows an example of the inverse conversion table in the case where the processing value is higher than the target density as in FIG. 9A. As shown by the solid line in FIG. 10, the output image data value has been converted to a value smaller than the input image data value, in order to make the obtained density closer to the target density.

Figure 11:
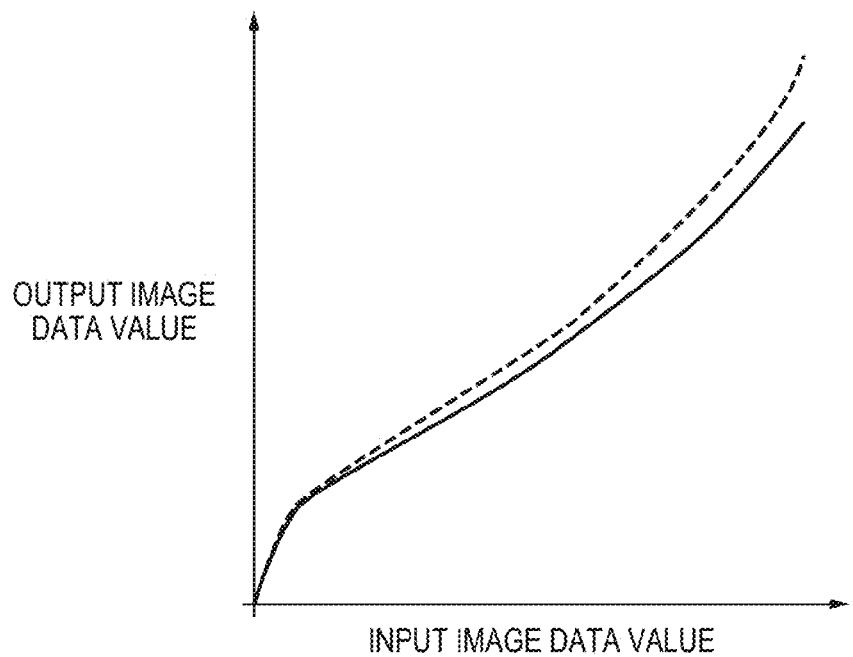
FIG. 11 is a graph showing a corrected tone correction table according to an embodiment.

In step S28, the control unit 110 updates the tone correction table (γLUT) held in the RAM 112, using the inverse conversion table. The dotted line in FIG. 11 shows the tone correction table before the correction in graph form. The solid line in FIG. 11 shows the corrected tone correction table in the case where the inverse conversion table is the one shown by the solid line in FIG. 10, in graph form. For example, the corrected tone correction table is obtained by multiplying the respective output image data values corresponding to the same input image data value in the tone correction table before the correction and the inverse conversion table, and dividing the multiplication result by the input image data value. The control unit 110 stores the corrected tone correction table in the RAM 112, and ends the correction control. Here, the control unit 110 also stores, in the RAM 112, information of whether or not the process in step S27 was performed, for the next correction control. Having ended the correction control, the control unit 110 performs image formation using the tone correction table stored in the RAM 112.

If the process in step S27 is performed, the tone correction table is corrected on an assumption that, for the solid image of the test pattern Q, not the actual detection result but the predetermined density is the detection result. The density of the image formed using the tone correction table corrected in this way deviates from the target density in the vicinity of the maximum density. Therefore, in this embodiment, the density-related image forming condition, i.e. the exposure amount, is changed in the case where the process in step S27 is performed. In detail, in the case where the control unit 110 determines that the density of the formed image is higher than the target maximum density but the maximum output value in the tone correction table cannot be decreased as shown in FIG. 9A, the control unit 110 decreases the exposure amount, to decrease the density of the image actually formed based on the same input image data value. Likewise, in the case where the control unit 110 determines that the density of the formed image is lower than the target maximum density but the maximum output value in the tone correction table cannot be increased as shown in FIG. 9B, the control unit 110 increases the exposure amount, to increase the density of the image actually formed based on the same input image data value. Here, if the exposure amount is changed following step S27 in one correction control, the subsequent image formation will end up being performed using the image forming condition different from when the test pattern Q is formed in step S21, causing a deviation of the density of the formed image from the target density. The control unit 110 in this embodiment accordingly stores information that the process in step S27 was performed, and changes the exposure amount in step S20 in the next correction control, that is, before the formation of the test pattern Q. The amount of change is increased or decreased by a predetermined amount.

Figure 7B:
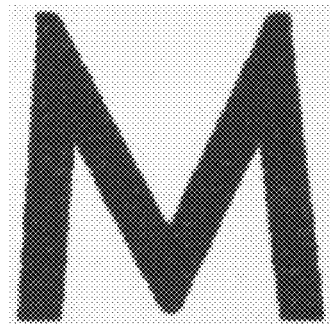

To confirm the advantageous effects of this embodiment, ten thousand sheets were continuously printed, and a comparison was conducted between the case of correcting the tone correction table using only the actual detection result of the test pattern Q and the case of correcting the tone correction table as shown in FIG. 6. When the tone correction table was corrected using only the actual detection result of the test pattern Q, jaggies appeared as shown in FIG. 7A. When the tone correction table was corrected according to FIG. 6, on the other hand, no jaggies appeared as shown in FIG. 7B.

Thus, the control unit 110 sets a tolerable range for the output image data value corresponding to the maximum input image data value in the tone correction table, and determines whether or not the output image data value in the corrected tone correction table is outside the tolerable range. In the case of determining that the output image data value is outside the tolerable range, the control unit 110 changes the detected density of the image of the maximum density in the test pattern Q to a predetermined density. Moreover, in the case of changing the detected density of the image of the maximum density in the test pattern Q to the predetermined density, the control unit 110 changes the density-related image forming condition in the next tone correction table correction control. This can reduce the deviation of the density of the formed image from the target density.

Second Embodiment

In the first embodiment, only the detection result of the solid image of the test pattern Q is changed in the correction control and, in the case where the detection result of the solid image is changed, the exposure amount is changed at the start of the next correction control. If the density of the formed image keeps decreasing and the amount of decrease of the image density is larger than the amount of change of the exposure amount, however, there is a possibility that the tone correction table is corrected to such a table where the output image data value is the same when the input image data value is not less than a predetermined value as shown by the solid line in FIG. 8. The tone characteristics cannot be maintained in such a case. In this embodiment, the detection result is changed not only for the solid image of the test pattern Q, but also for the intermediate density image. The image subjected to the detection result change may be every image of the test pattern Q, or each image not less than predetermined density. In this embodiment, all five images of the test pattern Q are subjected to the change.

Figure 12:
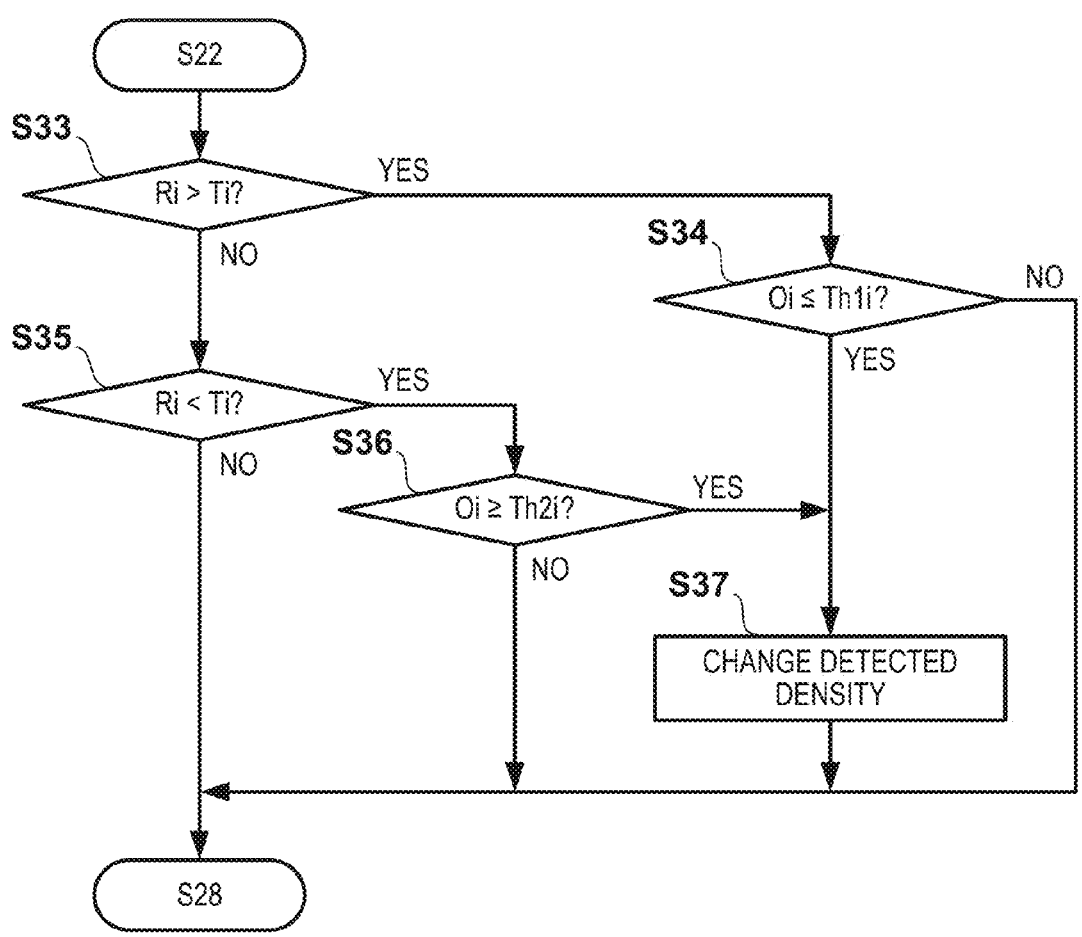
FIG. 12 is a flowchart showing tone correction table correction control according to an embodiment.

FIG. 12 is a flowchart showing tone correction table correction control according to this embodiment. In FIG. 12, steps S23 to S27 in FIG. 6 have been changed, while steps S20 to S22 and S28 are the same as those in FIG. 6. In FIG. 12, i is an index for distinguishing the five images of the test pattern Q, Ri is the detected density of the image i in step S22, Ti is the target density corresponding to the input value of image data used to form the image i, Oi is the output image data value in the tone correction table corresponding to the input image data value used to form the image i, and Th1i and Th2i are respectively the lower limit and upper limit of the tolerable range of the output image data value in the tone correction table corresponding to the input image data value used to form the image i. For example, Th1i and Th2i for the intermediate density image may be set to 0.8 times and 1.2 times the output image data value corresponding to the input image data value used to form the image i in the tone correction table generated by the tone correction control. Meanwhile, Th1i and Th2i for the solid image are the same as those in the first embodiment. The control unit 110 performs the process in FIG. 12 for each image i. This can prevent a situation where the correction of halftone portions in the tone correction table continues and the tone characteristics cannot be maintained.

Third Embodiment

In the first and second embodiments, the change of the exposure amount in step S20 in FIG. 6 is a predetermined value. However, if the change of the characteristics of the image forming apparatus is significant and cannot be compensated for by the exposure amount changed in step S20, the density deviation may become excessive. In this embodiment, the change of the exposure amount in step S20 in FIG. 6 is variable. The following describes how to determine the change of the exposure amount. The other processes in this embodiment are the same as those in the first and second embodiments.

First, the control unit 110 computes the change ratio of the detected density 81 of the solid image of the test pattern Q to the target maximum density 82 shown in FIGS. 9A and 9B, by the following expression:

(change ratio)=((detected density)/(target maximum density)−1)×100.

The control unit 110 sets a larger exposure amount change when the absolute value of the change ratio is larger. For example, the control unit 110 may set the exposure amount change as follows. When the absolute value of the change ratio is 10% or less, the exposure amount change is the same reference amount as in the first embodiment. When the absolute value of the change ratio is greater than 10% and not greater than 20%, the exposure amount change is twice the reference amount. When the absolute value of the change ratio is greater than 20%, the exposure amount change is three times the reference amount. The control unit 110 computes the exposure amount change in step S27 in FIG. 6 or step S37 in FIG. 12, and stores the exposure amount change in the RAM 112. When performing the next tone correction table correction control, the control unit 110 increases or decreases the exposure amount based on the value held in the RAM 112 in step S20 in FIG. 6.

By determining the amount of change of the exposure amount according to the change of the characteristics of the image forming apparatus, the tone characteristics of the formed image can be maintained and density closer to the target density can be attained.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-250555, filed on Dec. 3, 2013, which is hereby incorporated by reference herein in its entirety.

What is claimed is:

1. An image forming apparatus comprising:
a correction unit configured to correct image data based on a correction condition;
an image forming unit configured to form an image based on the image data corrected by the correction unit;
a measurement unit configured to measure a measurement image formed by the image forming unit;
an update unit configured to control the correction unit to correct measurement image data based on the correction condition, control the image forming unit to form the measurement image based on the corrected measurement image data, and update the correction condition based on a measurement result of the measurement image by the measurement unit and reference data corresponding to the measurement image; and
a control unit configured to control whether or not to convert a measuring result of a target measurement image among measurement images by the measurement unit to target reference data corresponding to the target measurement image,
wherein the control unit is configured to, in the case where a value obtained by correcting image data for forming the target measurement image based on the correction condition is outside a predetermined range, convert the measurement result of the target measurement image to the target reference data.

2. The image forming apparatus according to claim 1, further comprising a determination unit configured to, in the case where the measurement result of the target measurement image by the measurement unit is converted to the target reference data, determine a process condition for forming the measurement image by the image forming unit the next time an image is formed by the image forming unit, based on the measurement result of the target measurement image.

3. The image forming apparatus according to claim 1, wherein the value of image data for forming the target measurement image includes the maximum value of the measurement image data for forming the measurement image.

4. The image forming apparatus according to claim 3, wherein the maximum value of the measurement image data is the maximum value of the image data.

5. The image forming apparatus according to claim 1, wherein the control unit is further configured to convert the measurement result of the target measurement image to the target reference data, in the case where the measurement result of the target measurement image is greater than a value of the target reference data and the value obtained by correcting the image data for forming the target measurement image based on the correction condition is not greater than a first threshold, and in the case where the measurement result of the target measurement image is less than the value of the target reference data and the value obtained by correcting the image data for forming the target measurement image based on the correction condition is not less than a second threshold that is greater than the first threshold.

6. The image forming apparatus according to claim 1, wherein the control unit is configured to, in the case where the value obtained by correcting the image data for forming the target measurement image based on the correction condition is outside the predetermined range, convert the measurement result of the target measurement image outside the predetermined range, to the target reference data.

7. The image forming apparatus according to claim 1, wherein the predetermined range for a target measurement image, from among target measurement images, which is formed based on a value different from a maximum value of the image data, is determined based on the value obtained by correcting the image data based on the correction condition.

8. The image forming apparatus according to claim 1, wherein the control unit is further configured to, in the case of converting the result of measuring the target measurement image formed based on the maximum value of the image data to the target reference data, cause a holding unit to hold information indicating the conversion.

9. The image forming apparatus according to claim 2, wherein the determination unit is further configured to determine the process condition, based on a change ratio of the measurement result of the target measurement image to the target reference data corresponding to the target measurement image.

10. The image forming apparatus according to claim 2, wherein the determination unit is further configured to: change the process condition to decrease the density of the image formed by the image forming unit, in the case where the result of measuring the target measurement image formed based on a maximum value of the image data is greater than a value of the target reference data corresponding to the target measurement image; and change the process condition to increase the density of the image formed by the image forming unit, in the case where the result of measuring the target measurement image formed based on the maximum value of the image data is less than the value of the target reference data.

* * * * *